United States Patent [19]

McLane, Sr.

[11] Patent Number: 4,762,059
[45] Date of Patent: Aug. 9, 1988

[54] COOKING GRILL WITH GREASE COLLECTOR

[76] Inventor: Jack S. McLane, Sr., 3101 Bachman Rd., Gaston, S.C. 29053

[21] Appl. No.: 11,283

[22] Filed: Feb. 5, 1987

[51] Int. Cl.[4] .............................................. A47J 37/07
[52] U.S. Cl. ........................................ 99/445; 99/400; 99/446; 99/450; 126/25 R; 126/41 R
[58] Field of Search ................... 99/444–447, 99/400, 425, 450; 126/25 R, 41 R

[56] References Cited

U.S. PATENT DOCUMENTS

| | | | |
|---|---|---|---|
| 3,049,071 | 8/1962 | Diack | 99/340 |
| 3,418,921 | 12/1968 | Fautz | 99/445 |
| 3,443,510 | 5/1969 | Norton | 99/445 |
| 3,583,309 | 6/1971 | Freidenrich | 99/445 |
| 3,593,647 | 7/1971 | Copeland, Jr. | 99/259 |
| 3,667,449 | 6/1972 | Persinger et al. | 126/41 R |
| 3,982,476 | 9/1976 | McLane | 99/339 |
| 4,002,113 | 1/1977 | McLane | 99/447 |
| 4,034,662 | 7/1976 | McLane | 99/445 |
| 4,201,125 | 5/1980 | Ellis | 99/446 |
| 4,213,381 | 7/1980 | Ellis | 99/446 |
| 4,608,917 | 9/1986 | Faaborg | 99/446 X |
| 4,658,710 | 4/1987 | Quet et al. | 99/446 X |
| 4,683,867 | 8/1987 | Beatty | 99/444 X |

Primary Examiner—John Petrakes
Attorney, Agent, or Firm—Thomas & Kennedy

[57] ABSTRACT

Grease collector grates 48 and 49 are positioned within the housing 11, beneath the location of the food support grill 19, over the burner 26. The L-shaped grease collector bars 50 of the collector grates 48 and 49 prevent grease from falling downwardly to the burner 26, but the space between the collector bars permit the heat to move freely upwardly between the collector bars.

10 Claims, 1 Drawing Sheet

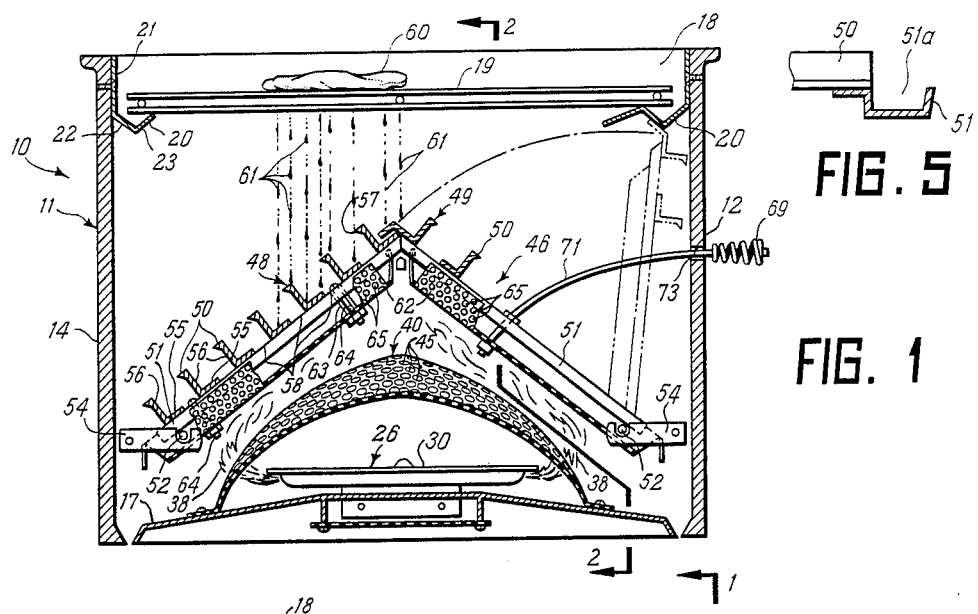
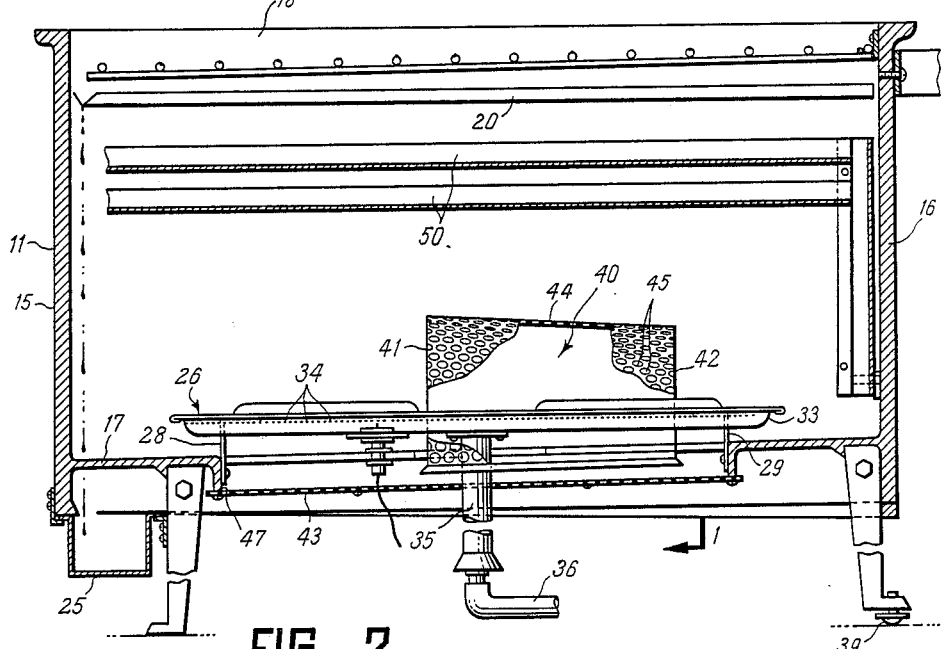
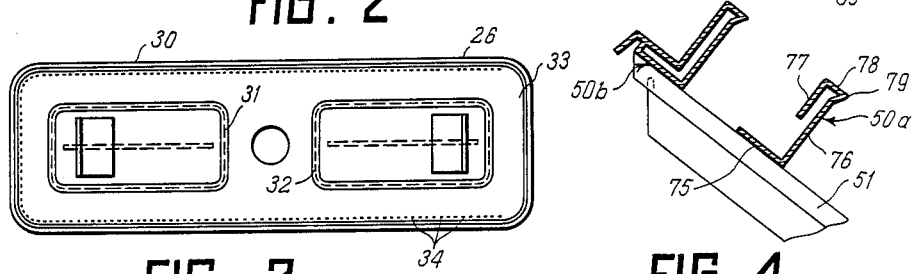

COOKING GRILL WITH GREASE COLLECTOR

FIELD OF THE INVENTION

This invention relates to cooking grills of the type soon which meat products and other food items are cooked, by placing the food item on an open food support grill and by applying an open flame heat source beneath the grill to cook the food product. More specifically, the invention relates to a grease collector used in combination with the other elements of the grill to collect grease drippings liberated from the food products and to avoid grease fires within the housing of the grill, and to uniformly distribute the heat from the heat source.

BACKGROUND OF THE INVENTION

Cooking grill are in common use which include a housing, a heat source within the housing and an open grill positioned over the heat source for supporting the food items that are to be cooked. Generally, grease and other matter tends to fall from the items being cooked downwardly into the heat source. This commonly causes small grease fires within the housing, which, if left uncontrolled, tend to burn the surfaces of the food items.

The grease drippings from food items are generally considered to add to the flavor of the food product if the grease can fall to the heat source and evaporate without causing a fire. The grease vapor and/or smoke generated from the grease tends to add a smoke like flavor to the food items. However, it is sometimes difficult to control the heat source and the amount of grease liberated from the food items so as to avoid a grease fire within the housing.

SUMMARY OF THE INVENTION

Briefly described, the present invention comprises a cooking grill with a grease collector positioned in the housing of the cooking grill above the heat source and below the food support grill. The grease collector generally comprises a pair of inclined open grate collector plates each formed of a plurality of parallel, closely spaced grease collector bars, with each bar partially overlying an adjacent bar so as to form a surface onto which grease liberated from the food product can fall, but the bars also form passages between adjacent ones of the bars for the upward movement of heat from the heat source below.

The grease collector plates become hot during the cooking process and when the grease falls upon the hot grease collector bars, the hot collector bars tend to evaporate the grease, generally without the hazard of igniting the grease and forming a grease fire. Further, the grease collector plates tend to become uniformly heated by the heat source, even if there is a "hot spot" at the heat source, so that heat is applied uniformly to the grill that supports the food product.

The heat collector plates usually are sloped upwardly from the side walls toward the center of the housing; however, the collector plates are pivotably mounted at their respective lower, outer edges to the housing so that they can be pivoted upright positions adjacent opposite side walls of the housing and out of the way of the heat source. A handle is provided for manipulating one of the grease collector plates from outside the housing, even when the housing has become hot. Therefore, in the event that the operator desired to inspect, clean or operate the apparatus with the grease collector plate in an out of the way position, the handle can be used to tilt the collector plate to an upright attitude. If the operator starts the cooking procedure with the collector plate in its upright, out-of-the-way position and later wishes to leave the grill unattended and avoid the hazard of a grease fire, the operator can tilt one or both of the collector plates over the heat source.

A grease drain system is also provided for permitting grease liberated from the food products to drain off the grease collector bars in the event of a large amount of grease being liberated from the food products into the housing.

Thus, it is an object of this invention to provide a cooking grill with a grease collector which generally functions to avoid grease fires within the housing of the cooking grill, which generally avoids direct contact of the grease with the primary heat source of the housing and which tends to uniformly spread the heat within the housing so as to avoid the existence of hot and cold spots at the level of the food support grill.

Another object of this invention is to provide a cooking grill for use in cooking food products, whereby the grill can be adjusted so as to avoid grease fires resulting from excessive liberation of grease from the product being cooked.

Another object of this invention is to provide an improved cooking grill for cooking food products which is relatively simple in its construction, which is durable and suitable for outdoor use, and which can be utilized to reliably cook food products without substantial hazard of grease fires.

Other objects, features and advantages of this invention will become apparent upon reading the following specification, when taken in conjunction with the accompanying drawings.

BRIEF DESCRIPTION OF THE DRAWINGS

FIG. 1 is an end elevational view, partially in cross section, of the cooking grill.

FIG. 2 is a side cross sectional view of the cooking grill, taken along lines 2—2 of FIG. 1.

FIG. 3 is a plan view of the gas burner or heat source for the cooking grill.

FIG. 4 is an end cross sectional view of two grease collector bars, representing alternate embodiments of the grease collector bars.

FIG. 5 is an end cross sectional view of a side support bar of a grate collector plate showing how a grease collector bar is mounted to the side support bar.

DETAILED DESCRIPTION

Referring now in more detail to the drawings, in which like numerals indicate like parts throughout the several views, FIG. 1 discloses a cooking grill 10 that includes a generally rectangular housing 11 with approximately upright front and rear walls 12 and 14, end walls 15 and 16 (FIG. 2) and a bottom wall 17. A hood or cover (not shown) typically will be pivotably mounted to one edge portion of the housing and movable between open and closed positions so as to cover the housing when the grill is being used for cooking food products. The side walls and end walls generally form an upper opening 18 to which the cover is applied. A grill 19 for supporting food products is supported at the upper portion of the housing, at upper opening 18, by inwardly extending gutters 20 which are mounted to the interior surface of the housing at the upper opening 18. Gutters 20 include an upright portion 21, a downwardly sloped portion 22 and an upwardly sloped portion 23, and any grease or other liquids that fall to the gutters will run along the lengths of the gutters. The gutters extend to side wall 15 and the grease and other liquids pour out the ends of the gutters and fall to the lower portion of the housing, into a grease pan 25.

The gas burner 26 is mounted in the lower portion of housing 11, and is supported in the housing by means of support straps 28 and 29 (FIG. 2). As illustrated in FIG. 3, burner 26 is formed from two plies of sheet material with a folded perimeter seam 30, inner perimeter seams 31 and 32, with gas exhaust openings 34 formed below the outer perimeter seam, in a U-shape about three sides of the burner. The gas induction conduit 35 (FIG. 2) extends vertically downwardly from the central portion of the burner, and the gas supply conduit 36 communicates with the lower portion of the induction conduit 35. A conventional control valve (not shown) communicates with gas supply conduit 36 so as to control the flow of gas to the burner. Also, a spark igniter (not shown) can be used to ignite the gas.

When the gas supply is cut on and communicates with burner 26 and the gas is ignited, a gas flame 38 is formed about the perimeter of the burner, as indicated in FIG. 1 so as to project heat upwardly within housing 11 in the conventional manner.

It will be noted from FIG. 2 that the housing 11 is slightly tilted, with the right portion of the housing being slightly higher than the left portion of the housing. This can be adjusted by the adjustable feet 39 of the right portion of the housing. However, burner 26 is sloped slightly with respect to the housing so that the burner is in a horizontal attitude and gas tends to be emitted from the gas exhaust openings 34 of the burner in uniform quanitities. The end 33 of the burner that has no gas outlet openings is adjacent the higher end of the housing so as to avoid the higher end of the housing from overheating.

Heat deflector 40 is mounted to bottom wall 18 and straddles burner 26. Heat deflector 40 is a foraminous sheet that arches over the burner, with one edge 41 of the sheet being longer than the opposite edge 42, so that the upper rounded surface 44 of the sheet is inclined upwardly to the left (FIG. 2) and tends to deflect heat from the burner in a left, upwardly inclined direction into the lower end portion of the housing. Of course, the openings 45 in the foraminous sheet also tend to liberally pass heat directly through the sheet so that the area above the heat deflector is not completely blocked from the heat source.

Foraminous bottom partition 43 spans bottom opening 47 in bottom wall 17 and the uniformly spaced openings of the foramenous bottom partition assures a substantially uniform flow of air upwardly into the area of burner 26.

Grease collector 46 is positioned in housing 11 above the burner 26 and beneath the food support grill 19, above heat deflector 40. Grease collector 46 comprises a pair of grease collector plates 48 and 49 each mounted at opposite side walls of housing 11. The grease collector plates are mirror images of each other, and each comprises a grate structure formed from a plurality of elongated, parallel L-shaped in cross section collector bars 50, with each bar mounted at its ends to a channel-shaped support bar 51, thereby forming a grate. A pivot pin 52 protrudes from each end of each collector plate adjacent its lower edge and each pivot pin 52 is supported by end brackets 54 which are mounted to the interior surfaces of housing 11.

As illustrated in FIG. 1, each elongated collector bar 50 is L-shaped in cross section having right angle legs 55 and 56, with the legs 55 being mounted in flat abutment with support bars 51 and with the legs 55 of each collector bar being parallel with the other legs 55 of the other collector bars and in a common plane therewith. With this arrangement, the right angle legs 55 and 56 form a grease receiving trough that faces upwardly within the housing 11.

The upper edge of the upwardly extending leg 56 of each collector bar 50 includes a laterally protruding flange 57 which functions as a grease drip flange that tends to cause grease to drip therefrom instead of having the grease run down the surface of the collector bar and fall down into the housing.

The collector bars 50 are spaced apart from one another, and the spaces 58 between the collector bars form heat passages, whereby heat from the burner 26 is permitted to pass between adjacent ones of the collector bars. Also, the upwardly inclined legs 56 of adjacent collector bars 50 and the grease dirp flanges 57 overlie the heat passages 58, so that grease liberated from food products 60 and falling downwardly within the housing 11 will not freely fall through a heat passage 58. The grease tends to become collected in the upwardly facing troughs formed by the collector bars 50.

Foramenous sheets 62 are rigidly mounted to the support bars 51 of the grease collector plates 58. The foraminous sheets 62 cover the entire lower surface of the grease collector plates, and are held in position by bolts 64 which pass through the plates 62 and through the support bars 51 and spacer sleeves 63 surround the bolts. The foraminous plates 62 permit the passage of heat through their openings 65, with the openings tending to uniformly spread the heat as the heat moves upwardly through the grease collector plates 48. Further, the foraminous plates become very hot because of the proximity of the plates to the flames 38, and the heat from the flames tends to move from the lower portion of the plates in an inclined direction upwardly toward the center of the housing 11. The heated foraminous plates 62 not only pass the heat through the plates but tend to heat the gases as the gases travel upwardly through the grease collector plates 48.

A handle 69 is connected to a grease collector plate 49 by means of rod 71 extending from the handle inwardly through an opening 73 in the front wall of the housing, with rod 73 being connected to a grease collector plate 49. When the handle 69 is pulled from outside the housing by the cook, its grease collector plate 49 will be tilted from the inclined attitude illustrated in FIG. 1 to a position approximately parallel to the side wall of the housing 11. Likewise, when the handle 69 is pushed toward the housing, the grease collector plate 49 will be tilted back from its upright attitude toward its sloped attitude. The upper edges of the grease collector plates 48 and 49 will abut each other and become mutually supportive when both plates are in their inclined attitudes.

As illustrated in FIG. 2, the collector bars 50 of the grease collector plates 48 and 49 are sloped downwardly from right to left, with the left end portions of the grease collector bars terminating adjacent end wall 11. With this arrangement, if enough grease 61 being liberated from the food product 60 is collected in one or more of the collector bars, the grease will tend to run downhill in the troughs of the collector bars until the grease reaches end wall 11, whereupon the grease moves into the trough 51a of end bar 51 (FIG. 5) and runs down the incline of the trough 51a and falls from the lower end of the trough and is collected in the grease pan 25. In most instances, however, the collector bars 50 become very hot during the cooking process and the grease collected therein tends to evaporate, with the vapors rising within the housing and passing up about the food products 60 being cooked on the cooking grill. This tends to add flavor to the food product. Further, since the grease does not tend to fall directly to the heat source or burner 26, the likelihood of the grease igniting within the housing 11 is substantially reduced, if not completely eliminated.

The grease collector bars 50 have been illustrated in FIGS. 1 and 2 as being generally L-shaped or V-shaped and of solid construction. FIGS. 4 and 5 disclose modifications of the grease collector bars. The grease collector bar 50A of FIG. 4 includes one leg portion 75 which is mounted to the support bar 51 and an upwardly inclined leg 76, and then a folded back leg 77 joined by end panel 78 to leg 76. Drip flange 79 is formed at the intersection of legs 76 and 78. With this arrangement, the portion 77 of the grease collector bar forms an air gap with respect to the portion 76, such that the portion 77 usually is maintained at a lower temperature than the remaining portion of the collector bar. This tends to further avoid ignition of the grease falling to the collector bars.

FIG. 5 illustrates another modification of the grease collector bars, whereby the grease collector bar 50B is hollow and its internal air gap tends to reduce the transfer of heat from the bottom convex portion to the top concave portion of the collector bar, so that when the grease falls to the lower temperature upper surface of the collector bar, the tendency of flare up is reduced.

It will be noted from an observation of FIG. 1 that the grease collector plates 48 and 49 can be removed from the housing by disconnecting the handle 69 from the collector plate and simply lifting the collector plate out of its support bracket 54. This expedites the cleaning of the grease collector plates and exposes the interior of the housing for cleaning, repair, etc.

The use of the heat deflector 40 and the grease collector plates 48 and 49 within the housing not only avoids the flare up of grease liberated from the food product, but also tends to form a heat sink within the housing, whereby heat is uniformly emitted, much like the function of noncombustible briquettes utilized in conventional gas grills. Further, the use of foraminous sheet material tends to uniformly control heat convection upwardly through the housing. The net result of this appears to result in a saving of the amount of gas required for cooking purposes. Also, the amount of heat generated at the food support grill 19 at the upper opening of the housing can be increased to a higher than normal level substantially without hazard of causing a grease fire within the housing. While most of the grease liberated from the food product will become evaporated when it engages the hot surfaces of the collector plates 48 and 49, when the volume of gas supplied to the burner is high, it is possible that some of the grease drippings will tend to flicker or flare. However, since the collector plates 48 and 49 tend to evaporate the grease so fast and since the collector plates collect the greases in different locations across the surface of the grill, the tendency of the grease to become ignited and form a small grease fire is greatly reduced.

It should be understood that the foregoing description relates only to a preferred embodiment of the present invention, and that numerous modifications or alterations may be made therein without departing from the spirit and scope of the invention as set forth in the appended claims.

I claim:

1. A cooking apparatus for cooking meats and other foods comprising a housing defining an upper opening with means for supporting a food support grill in an approximately horizontal attitude at said upper opening, a source of heat positioned in said housing beneath said upper opening, a grease collector positioned between said heat source and said food support grill, said grease collector comprising a plurality of rectilinear, grease collection bars supported in closely spaced relationship with respect to each other to define heat passages therebetween, each of said grease collection bars having a first leg and a second leg, with the bars each arranged with one of their ends lower than the other, and with the first legs of the bars arranged in a common inclined plane and with the second leg of each bar extending over the heat passage formed between the next adjacent bar, whereby the bars generally prevent grease drippings from falling through the heat passages and permit heat to pass upwardly through the heat passages.

2. The apparatus of claim 1 and wherein said grease collector bars are L-shaped in cross section and are attached at their ends to transversly extending support bars, said grease collector bars and support bars forming a pair of grease collector grates, each grate including a lower edge pivotably mounted to opposite sides of said housing and pivotable from an approximately upright position to an upwardly inclined position with its opposite edge portion juxtaposed the opposite edge portion of the other grate at a position directly over said heat source.

3. The apparatus of claim 2 and wherein said grease collector grates further include a foraminous sheet positioned parallel to and beneath said collector bars.

4. The apparatus of claim 2 and further including a handle means connected to at least one of said grease collector grates and extending outside of said housing for pivoting said grease collector grate between its approximately upright position to its upwardly inclined position.

5. The apparatus of claim 1 and further including a heat deflector positioned between said heat source and said grease collector for deflecting the heat toward one end portion of said housing.

6. The apparatus of claim 5 and wherein said heat deflector comprises a foraminous sheet straddling said heat source.

7. The apparatus of claim 1 and wherein said source of heat comprises a gas burner and wherein said housing defines a bottom opening beneath said gas burner with a foraminous sheet spanning said opening.

8. A cooking apparatus for cooking meats and other foods comprising a housing defining an upwardly facing opening and means for supporting a food support grill at said opening, a source of heat positioned in said housing beneath said upwardly facing opening, a grease collector positioned between said heat source and said food support grill, said grease collector comprising a plurality of elongated grease collector bars arranged in spaced parallel relationship to one another and in overlying relationship and defining heat passages therebetween, said grease collector bars being L-shaped in cross section and being in shingle-stacked spaced parallel relationship with the legs of the L-shape extending inwardly so that one leg of each L-shaped collector bar overlies a leg of a L-shaped collector bar next below, whereby grease falling onto the grease collector bars tends to accumulate on the grease collector bars.

9. A grease collector for placement in the housing of a cooking apparatus beneath an open cooking grill, said grease collector comprising a plurality of elongated, L-shaped in cross section collector bars arranged in spaced parallel relationship with both legs of the L-shape normally inclined upwardly, said collector bars each having one of the legs of its L-shape supported in a common inclined plane and the other of its legs of its L-shape overlying the space between the next adjacent collector bar.

10. The grease collector of claim 9 and further including a foraminous sheet juxtaposed the lower surfaces of said grease collector bars.

* * * * *